United States Patent
Roth (10) Patent No.: US 10,762,309 B2
(45) Date of Patent: Sep. 1, 2020

(54) RFID MOBILE WORKSTATION DEVICE

(71) Applicant: Avery Dennison Retail Information Services, LLC, Mentor, OH (US)

(72) Inventor: Mark W Roth, North Miami, FL (US)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 14/576,629

(22) Filed: Dec. 19, 2014

(65) Prior Publication Data

US 2016/0180124 A1 Jun. 23, 2016

(51) Int. Cl.
| | |
|---|---|
| *G06K 7/08* | (2006.01) |
| *G06K 7/10* | (2006.01) |
| *G07G 1/00* | (2006.01) |
| *B62B 3/00* | (2006.01) |
| *B62B 5/00* | (2006.01) |
| *B62B 3/14* | (2006.01) |

(52) U.S. Cl.
CPC ............ *G06K 7/10316* (2013.01); *B62B 3/00* (2013.01); *G06K 7/10009* (2013.01); *G07G 1/009* (2013.01); *G07G 1/0081* (2013.01); *B62B 3/005* (2013.01); *B62B 3/1424* (2013.01); *B62B 5/0096* (2013.01); *G06K 2007/10504* (2013.01)

(58) Field of Classification Search
CPC .......................... G06K 7/0008; G06K 17/0025
USPC ............................... 235/451, 462.46, 472.02
See application file for complete search history.

(56) References Cited

U.S. PATENT DOCUMENTS

| | | | |
|---|---|---|---|
| 4,071,740 A | 1/1978 | Gogulski | |
| 4,929,819 A | 5/1990 | Collins, Jr. | |
| 5,250,789 A | 10/1993 | Johnsen | |

(Continued)

FOREIGN PATENT DOCUMENTS

| | | |
|---|---|---|
| BR | MU9001028 U2 | 2/2012 |
| CN | 1912914 | 2/2007 |

(Continued)

OTHER PUBLICATIONS

International Preliminary Report on Patentability dated Jun. 20, 2017 issued in correspondence to International Patent Application No. PCT/US15/066234.

(Continued)

*Primary Examiner* — Daniel St Cyr
(74) *Attorney, Agent, or Firm* — Avery Dennison Retail Information Services, LLC (57) ABSTRACT

A mobile radio frequency identification (RFID) device for use with supply chain operations, association of things, and work in process operations. The mobile RFID device comprises a cart comprising four wheels and a handle for guiding its motion. The cart also comprises a top surface, an open lower shelf below the top surface, and a lower enclosure below the open lower shelf. The top surface of the cart comprises a very refined RF field which only scans items within a defined area. The defined area can be a flat work surface or a recessed well. The top surface also comprises a directional antenna that is completely hidden and communicatively coupled to an RFID reader. The lower enclosure below the open lower shelf is an enclosed storage cabinet that can house an RFID reader, an inverter (DC to AC), a battery, and a charger for the battery.

18 Claims, 5 Drawing Sheets

(56) References Cited

U.S. PATENT DOCUMENTS

| | | | |
|---|---|---|---|
| 5,418,354 | A | 5/1995 | Halling et al. |
| 5,836,051 | A | 11/1998 | Myers |
| 6,997,382 | B1 | 2/2006 | Bhri |
| 7,924,161 | B1* | 4/2011 | Spindel ............... G06K 7/0008 340/572.4 |
| 9,316,502 | B2* | 4/2016 | Moore ............... G01C 21/165 |
| 2002/0170961 | A1 | 11/2002 | Dickson et al. |
| 2002/0174025 | A1 | 11/2002 | Hind et al. |
| 2004/0065732 | A1 | 4/2004 | Bernds et al. |
| 2004/0073489 | A1 | 4/2004 | Varatharajah et al. |
| 2004/0262385 | A1 | 12/2004 | Blaeuer |
| 2005/0035198 | A1 | 2/2005 | Wilensky |
| 2005/0149391 | A1 | 7/2005 | O'Shea et al. |
| 2005/0187819 | A1 | 8/2005 | Johnson |
| 2005/0230472 | A1 | 10/2005 | Chang |
| 2006/0208072 | A1* | 9/2006 | Ku ..................... G06K 7/0008 235/383 |
| 2006/0289637 | A1 | 12/2006 | Brice et al. |
| 2007/0125848 | A1 | 6/2007 | Bennetto Piamenta |
| 2007/0228680 | A1 | 10/2007 | Reppert et al. |
| 2008/0001760 | A1 | 1/2008 | Oh et al. |
| 2008/0230603 | A1 | 9/2008 | Stawar et al. |
| 2008/0238009 | A1* | 10/2008 | Carpenter ............ B62B 3/1408 280/33.992 |
| 2008/0272914 | A1* | 11/2008 | Murray ............... G06K 7/0008 340/572.1 |
| 2008/0308630 | A1 | 12/2008 | Bhogal et al. |
| 2009/0230643 | A1 | 9/2009 | Eckert et al. |
| 2009/0322481 | A1 | 12/2009 | Marr, III |
| 2010/0123559 | A1 | 5/2010 | Wilkinson et al. |
| 2010/0264205 | A1 | 10/2010 | Iida |
| 2011/0036907 | A1 | 2/2011 | Connelly |
| 2012/0226556 | A1 | 9/2012 | Itagaki et al. |
| 2012/0284132 | A1 | 11/2012 | Kim et al. |
| 2014/0001258 | A1 | 1/2014 | Chan et al. |

FOREIGN PATENT DOCUMENTS

| | | |
|---|---|---|
| CN | 100416601 | 9/2008 |
| CN | 201172418 | 12/2008 |
| CN | 101675201 | 3/2010 |
| CN | 102050141 | 5/2011 |
| CN | 202225981 U | 5/2012 |
| CN | 202463856 U | 10/2012 |
| CN | 202650020 | 1/2013 |
| CN | 203070359 U | 7/2013 |
| CN | 203070437 U | 7/2013 |
| CN | 203208276 U | 9/2013 |
| CN | 203450152 U | 2/2014 |
| CN | 103679093 | 3/2014 |
| CN | 103921814 A | 7/2014 |
| CN | 203689570 U | 7/2014 |
| DE | 3619362 | 12/1987 |
| DE | 19643122 | 4/1998 |
| DE | 202009009680 U1 | 12/2009 |
| DE | 102009045935 | 7/2010 |
| EP | 1583050 | 10/2005 |
| EP | 2066546 | 6/2009 |
| EP | 2381409 | 10/2011 |
| ES | 2102311 | 7/1997 |
| FR | 2699381 | 6/1994 |
| FR | 2746529 | 9/1997 |
| FR | 2847366 | 5/2004 |
| GB | 2447051 | 9/2008 |
| JP | 6305424 | 11/1994 |
| JP | 8142871 | 6/1996 |
| JP | 2113782 | 12/1996 |
| KR | 20010091097 | 10/2001 |
| KR | 20050009097 | 1/2005 |
| KR | 100570797 | 4/2006 |
| KR | 100608252 | 8/2006 |
| KR | 20060118172 | 11/2006 |
| KR | 100716906 | 5/2007 |
| KR | 20070081618 | 8/2007 |
| KR | 20080103636 | 11/2008 |
| KR | 100995596 B1 | 1/2010 |
| KR | 101013366 B1 | 2/2011 |
| KR | 101340858 B1 | 12/2013 |
| KR | 20140122629 | 10/2014 |
| TR | 200900201 | 8/2009 |
| WO | 0073971 | 12/2000 |
| WO | 0201476 | 1/2002 |
| WO | 2012093800 A2 | 7/2012 |
| WO | 2012168515 | 12/2012 |
| WO | 2013149549 | 10/2013 |

OTHER PUBLICATIONS

International Search Report and Written Opinion dated Jun. 1, 2016 issued in corresponding International Application No. PCT/US15/066234.

Smartstation™, Tagtron Solutions, http://www.tagtron.co.za/wp-content/uploads/2016/09/STAFF-STATION1.pdf, Oct. 4, 2016.

IntelliCart™ Mobile RFID Cart, Venture Research Inc., https://www.rfidsolutionsonline.com/doc/intellicart-mobile-rfid-cart-0001, Jul. 1, 2011.

Chaotic Moon Labs' Smarter Cart, Chaoyis Moon, LLC—Fjord, https://www.wired.com/2012/02/shoppingcart, Feb. 28, 2012.

A Self-Checkout e-Shopping Cart That Uses RFID Technology, Tuvie—Futuristic Technology, A Self-Checkout e-Shopping Cart That Uses RFID Technology, Apr. 11, 2011.

Powered Mobility Carts, Storage Battery Systems, LLC, http://www.sbsbattery.com/products-services/by-product/powered-mobile-carts.html?pk_campaign=cart-catalog, Jul. 17, 2013.

Enabling RFID in Ret, ail, Birkbeck College, London University, http://ieeexplore.ieee.org/xpl/login.jsp?tp=&arnumber=1607945&url=http%3A%2F%2Fieeexplore.ieee.org%2Fxpls%2Fabs_all.jsp%Farnumber%3D1607945, Mar. 20, 2006.

\* cited by examiner

RFID MOBILE WORKSTATION DEVICE

BACKGROUND

The present invention relates generally to radio frequency identification (RFID) systems and devices. More particularly, the present disclosure relates to a mobile cart with RFID capability for use with supply chain operations, pick/pack processes, commissioning of RFID tags, induction of RFID products into a database, association of things, construction of assemblies, and work in process operations.

Radio frequency identification (RFID) tags are electronic devices that may be affixed to items whose presence is to be detected and/or monitored. The presence of an RFID tag, and therefore the presence of the item to which the RFID tag is affixed, may be checked and monitored by devices known as "readers" or "reader panels." Readers typically transmit radio frequency signals to which the RFID tags respond. Each RFID tag can store a unique identification number. The RFID tags respond to reader-transmitted signals by providing their identification number and additional information stored on the RFID tag based on a reader command to enable the reader to determine identification and characteristics of an item.

Currently, most RFID readers are limited to a stationary location, or to a handheld configuration that reads RFID tags within a limited range, for example, two to six feet. Thus, utilizing a substantially fixed location RFID device typically requires transportation of at least some of the items to and through a stationary, portal type RFID system, which limits flexibility. Current handheld RFID devices have reduced power output, range, and accuracy of data collection, due to limited antenna read range and battery power. They also lack durability, wherein a user might lose or drop the handheld device.

The present invention discloses a mobile RFID device that comprises a wheeled cart with a very refined RF field that only scans items within a defined read zone. The defined read zone can be a flat work surface or a recessed well. The cart also comprises a directional antenna that is completely hidden and communicatively coupled to an RFID reader. The directional antenna focuses RF energy within the defined read zone, such that items are scanned only within the defined area. Thus, users can navigate up and down narrow aisle-ways without detecting RFID transponders (tags) unless specifically placed in the defined area (i.e., read zone). Further, the mobile RFID device provides users with a mobile, hands-free environment that allows users to move the device (workstation) to the spot where work is to be performed and then have both hands free to grab/pick/manipulate items from shelves, aisles, etc. The mobile RFID device is also extremely durable and users do not have to worry about losing or dropping the device.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a mobile radio frequency identification (RFID) device for use with supply chain operations, pick/pack processes, commissioning of RFID tags, induction of RFID products into a database, association of things, construction of assemblies, and work in process operations. The mobile RFID device comprises a cart comprising four wheels and a handle for guiding its motion. The cart also comprises a top surface, an open lower shelf below the top surface, and a lower enclosure below the open lower shelf. The top surface of the cart comprises a very refined RF field which only scans items within a defined area. The defined area can be a flat work surface or a recessed well. The top surface also comprises a directional antenna that is completely hidden and communicatively coupled to an RFID reader. The directional antenna focuses RF energy within the defined area, such that items are scanned only within the defined area. Thus, users can navigate up and down narrow aisle-ways without detecting RFID transponders (tags) unless specifically placed in the defined area (i.e., read zone).

The open lower shelf in the immediate vicinity below the top surface allows a user to store items without the RFID reader detecting RFID tags that may be placed there. The lower enclosure below the open lower shelf is an enclosed storage cabinet that can house a variety of items, such as a RFID reader, an inverter (DC to AC), a battery, and a charger for the battery. The device can also comprise an electrical cord and plug, such that the device can be plugged-in providing necessary AC power.

In a preferred embodiment, the top surface can comprise additional peripheral devices required to make a complete workstation system. For example, the device can comprise a processing unit and a barcode scanner mounted to the wheeled cart and communicatively coupled to the RFID reader for operational control of the RFID reader.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a mobile RFID device that comprises a wheeled cart with a very refined RF field that only scans items within a defined read zone. The defined read zone can be a flat work surface or a recessed well. The cart also comprises a directional antenna that is completely hidden and communicatively coupled to an RFID reader. The directional antenna focuses RF energy within the defined read zone, such that items are scanned only within the defined area. Thus, users can navigate up and down narrow aisle-ways without detecting RFID transponders (tags) unless specifically placed in the defined area (i.e., read zone). Further, the mobile RFID device provides users with a mobile, hands-free environment and is extremely durable so users do not have to worry about losing or dropping the device.

Referring initially to the drawings, FIGS. 1-4 illustrate a mobile radio frequency identification (RFID) device 100 for use with, but not exclusive of, supply chain operations, pick/pack processes, commissioning of RFID tags, induction of RFID products into a database, association of things, construction of assemblies, and work in process. The mobile RFID device 100 uses a very refined RFID field to only scan items within a defined area 102 of the mobile RFID device 100. The defined area 102 can be a flat work surface 104 or a recessed well 300 (see FIG. 3). The mobile RFID device 100 provides 100% mobility in a form factor other than a hand held device.

Thus, the mobile RFID device 100 provides a user with a hands-free environment. Users can move the mobile RFID device 100 to the spot where work is to be performed and then have both hands free to grab/pick/manipulate items from shelves. Unlike a hand held device where one hand must hold the device to scan, and the other hand must try to move the item. The mobile RFID device 100 provides a comfortable place to combine items (i.e., bagging, tagging, assembling, etc.) that would not be practical by other means. Furthermore, the mobile RFID device 100 is extremely durable and users do not have to worry about losing or dropping the device, as with the hand held devices.

The mobile RFID device 100 comprises a cart 106 or other suitable mobile container for transporting items as is known in the art. The cart 106 is typically manufactured of metal, but could be manufactured of any other suitable material as is known in the art, such as plastic, etc. The cart 106 comprises four wheels 108 or casters, and a handle 110 for guiding its motion. The handle 110 can be secured to any suitable position on the cart 106 to allow a user to push or pull the cart 106 via the handle 110.

Figure 1:
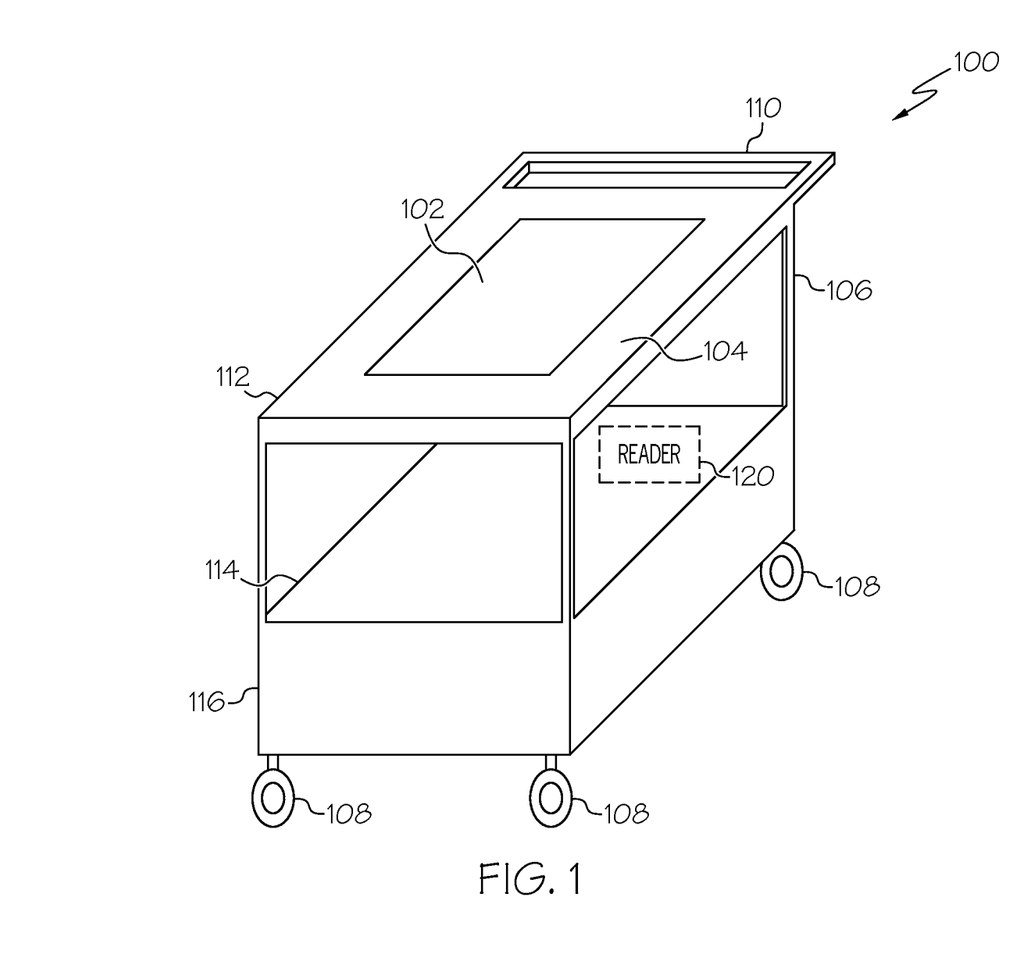
FIG. 1 illustrates a perspective view of the mobile RFID device with a flat work surface confined read zone in accordance with the disclosed architecture.
Figure 2:
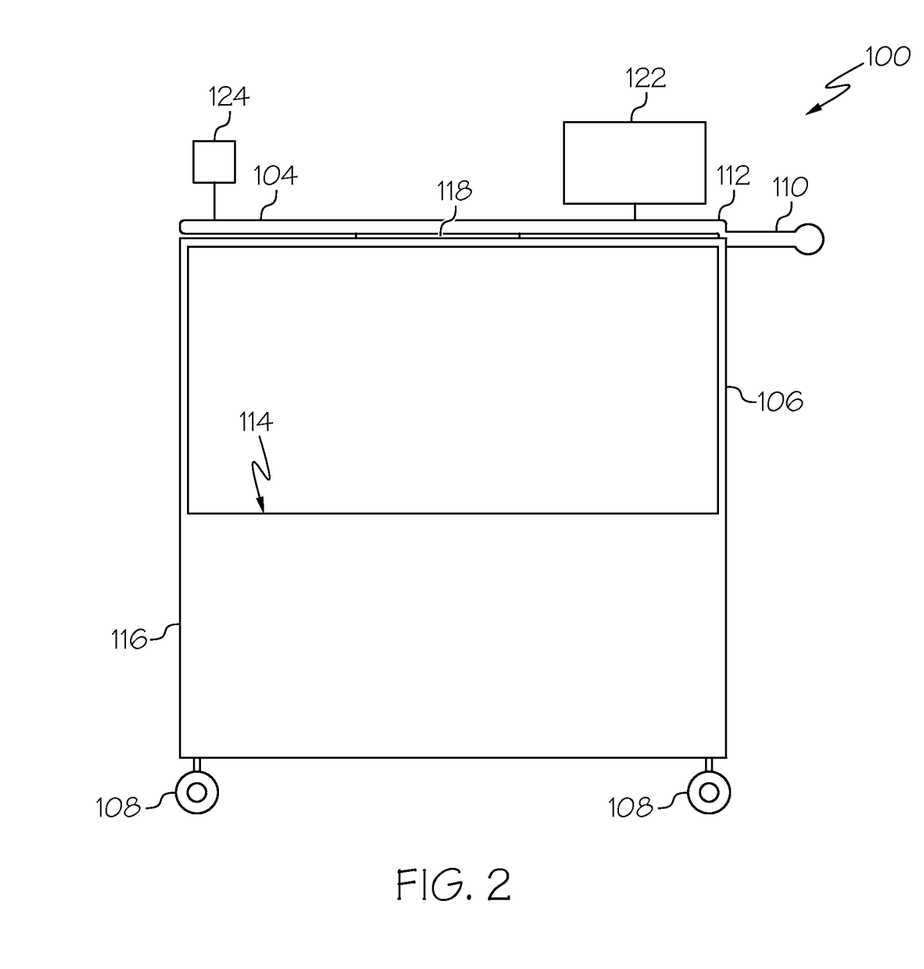
FIG. 2 illustrates a side view of the mobile RFID device with a flat work surface confined read zone in accordance with the disclosed architecture.
Figure 3:
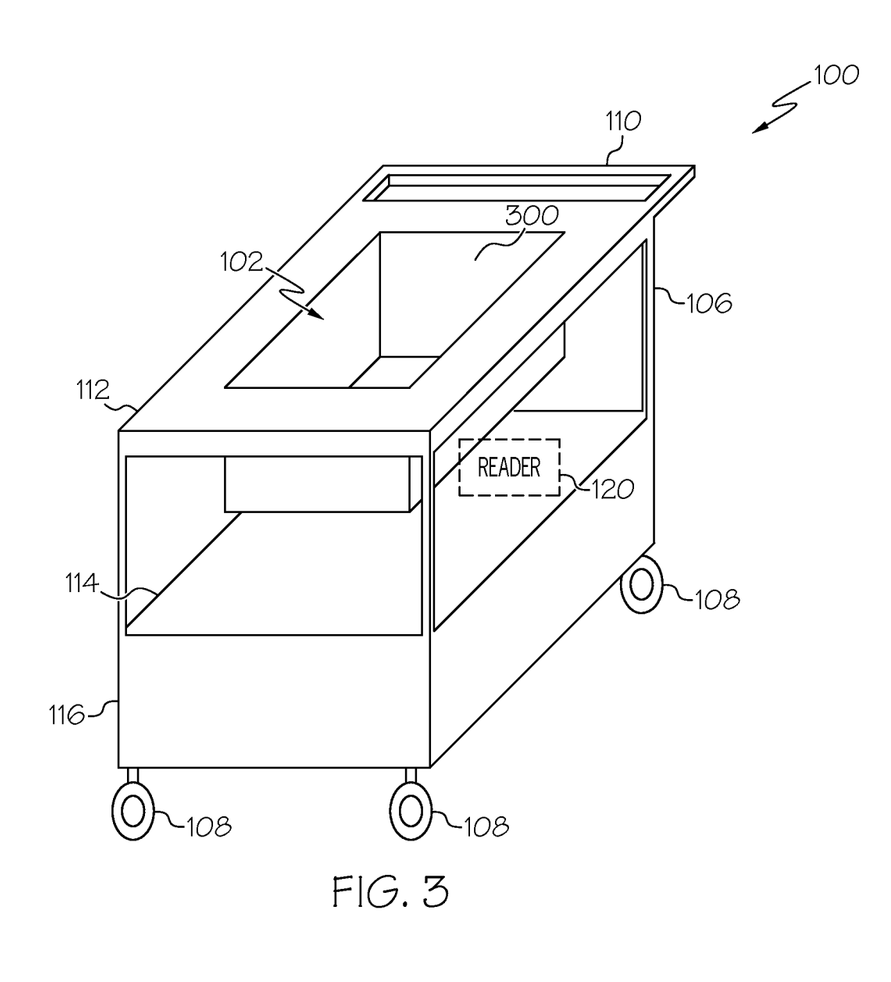
FIG. 3 illustrates a perspective view of the mobile RFID device with a recessed well confined read zone in accordance with the disclosed architecture.

The cart 106 also comprises a top surface 112, an open lower shelf 114 below the top surface 112, and a lower enclosure 116 below the open lower shelf 114, or any other suitable configuration of shelves, surfaces, and enclosures as is known in the art. Furthermore, the cart 106 can be any suitable size, shape, and configuration as is known in the art without affecting the overall concept of the invention. One of ordinary skill in the art will appreciate that the interior and/or exterior shape of the cart 106 as shown in FIGS. 1-3 is for illustrative purposes only and many other shapes and/or configurations of the cart 106, such as a square, are well within the scope of the present disclosure. Although dimensions of the cart 106 (i.e., length, width, and height) are important design parameters for good performance, the cart 106 may be any shape that ensures an optimal read zone within the defined area 102.

The top surface 112 of the cart 106 comprises a very refined RF field which only scans items within a defined area 102. The defined area 102 can be a flat work surface 104 (see FIG. 1) or a recessed well 300 (see FIG. 3). The flat work surface 104 is typically used when two apparel items need to be combined to make an ensemble. In this activity, there is not an accumulation of items; it is simply a work in process step. However, the flat work surface 104 can be used with any suitable process as is known in the art and not just in combining apparel items to make an ensemble. The recessed well 300 is where a carton, tote, or bin is placed for scanning, accumulation, or induction of RFID items (see FIG. 3). RFID reads only within this confined space.

Figure 4:
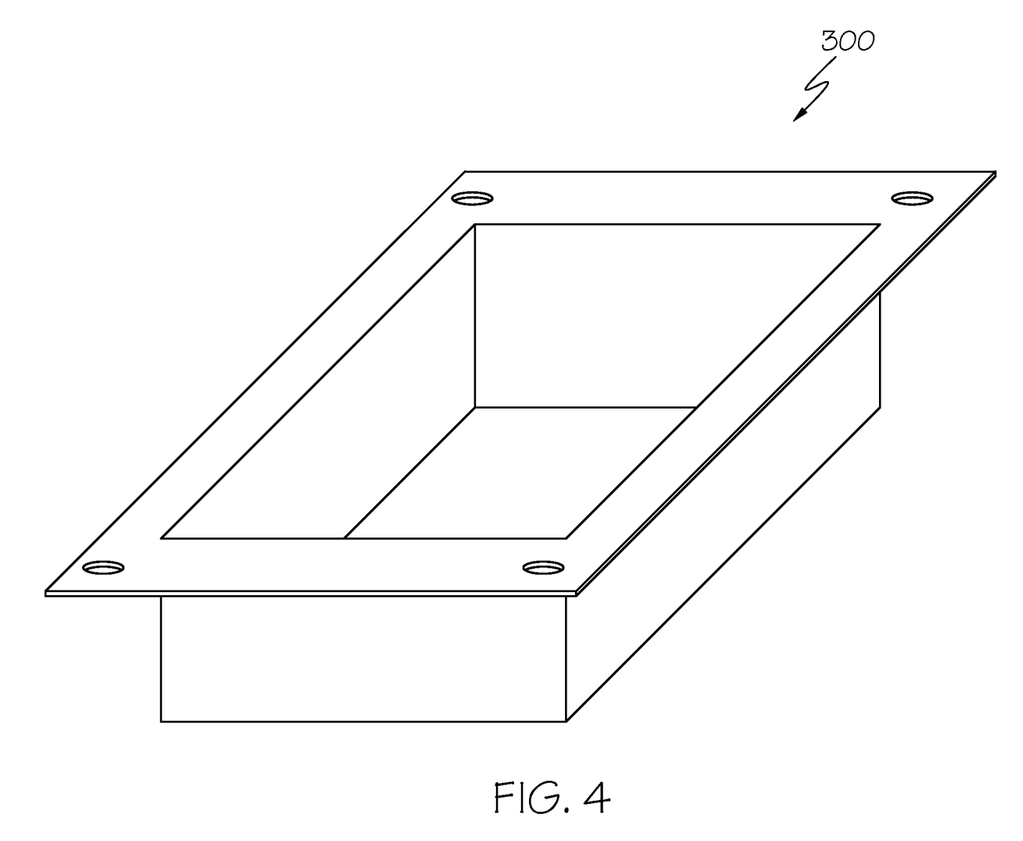
FIG. 4 illustrates a perspective view of the recessed well confined read zone of the mobile RFID device in accordance with the disclosed architecture.

As shown in FIG. 4, an aluminum tub can sit into the existing opening of the supplied cart frame to form the recessed well 300. The tub is approximately 12 inches deep, but can be any suitable depth as is known in the art. Thus, the recessed well 300 is typically used when order fulfillment needs to take place and the user must navigate up and down narrow aisles picking items from stock locations. For example, the user may be instructed on how (what direction) and where to go (what aisle) to make the picking process the most efficient with regard to labor hours. However, the recessed well 300 can be used with any suitable process as is known in the art, and not just in order fulfillment needs.

Furthermore, the flat work surface 104 or the recessed well 300 can be any suitable size, shape, and configuration as is known in the art without affecting the overall concept of the invention. One of ordinary skill in the art will appreciate that the size and shape of the flat work surface 104 and the recessed well 300 as shown in FIGS. 1-4 is for illustrative purposes only and many other shapes and/or configurations of the flat work surface 104 and the recessed well 300 are well within the scope of the present disclosure. Although dimensions of the flat work surface 104 and the recessed well 300 (i.e., length, width, and height) are important design parameters for good performance, the flat work surface 104 and the recessed well 300 may be any shape that ensures an optimal read zone within the defined area 102.

The top surface 112 also comprises a directional antenna 118 that is completely hidden and communicatively coupled to an RFID reader 120 via antenna cables or other suitable means. The directional antenna 118 focuses RF energy within the defined area 102, such that items are scanned only within the defined area 102. The directional antenna 118 is embedded on the top surface 112 of the cart 106 in any suitable position on the top surface 112, such that the directional antenna 118 focuses RF energy within the defined area 102. The directional antenna 118 provides the device 100 with the capability for energizing RFID tags and receiving data only from the RFID tags which are located within the defined area 102 (i.e., read zone). Thus, users can navigate up and down narrow aisle-ways without detecting RFID transponders (tags) unless specifically placed in the defined area 102 (i.e., read zone).

Additionally, the top surface 112 can comprise additional peripheral devices required to make a complete workstation system (see FIG. 2). For example, the device 100 can comprise a processing unit 122 mounted to the wheeled cart 106 and communicatively coupled to the RFID reader 120 for operational control of the RFID reader 120. The processing unit 122 is typically a touchscreen unit, but can be any suitable processing unit as is known in the art. The processing unit 122 processes and analyzes information received from the RFID tags. The solution includes a software application to provide a user interface and feedback to the user and control reader functions.

Data can be collected and stored locally on the processing unit 122, or data can be interfaced wirelessly to an information technology (IT) infrastructure. Thus, the application can be stand-alone (batch) or may perform interactive lookup functions with a host computer system. For example, retrieving a parts list for picking items that are part of an assembly. Further, the device 100 can comprise a barcode scanner 124 mounted to the wheeled cart 106 and communicatively coupled to the RFID reader 120. Additional peripheral devices can be added easily for even more robust functionality.

The open lower shelf 114 (or storage area) in the immediate vicinity below the top surface 112 allows a user to store items without the RFID reader 120 detecting RFID tags that may be placed there. For example, a user could store packaging material, tape dispensers, etc., on the open lower shelf 114. Thus, the open lower shelf 114 or storage area is not affected by RFID and can be used to store a variety of items.

The lower enclosure 116 below the open lower shelf 114 is an enclosed storage cabinet that can house a variety of items, such as a RFID reader 120, an inverter (DC to AC), a battery, a charger for the battery, and other suitable power and communications items as is known in the art which can be mounted to the cart 106. Typically, the inverter is a 110 volt inverter to support the plurality of peripheral devices, and functions to convert DC to AC power. The 110 volt inverter allows additional hardware items to be added easily for even more robust functionality. The device 100 can also comprise an electrical cord and plug, such that the device 100 can be plugged-in to a wall receptacle (or outlet) providing necessary AC power which does not utilize a battery.

The device 100 can be used via plugging the device 100 into a wall receptacle (outlet) or once the device 100 is powered up and the battery charged (via the inverter), the device 100 can be unplugged and powered via the battery. The battery is typically a rechargeable, extended use battery for extended operational capability, such as a twelve volt, 86 ampere hour battery. Further, the RFID reader 120 is a fixed reader that is mounted to the cart 106, typically within the lower enclosure 116. The RFID reader 120 interrogates and receives information from the aforementioned RFID tags and forwards the information to the processing unit 122 for processing and analysis.

Figure 5:
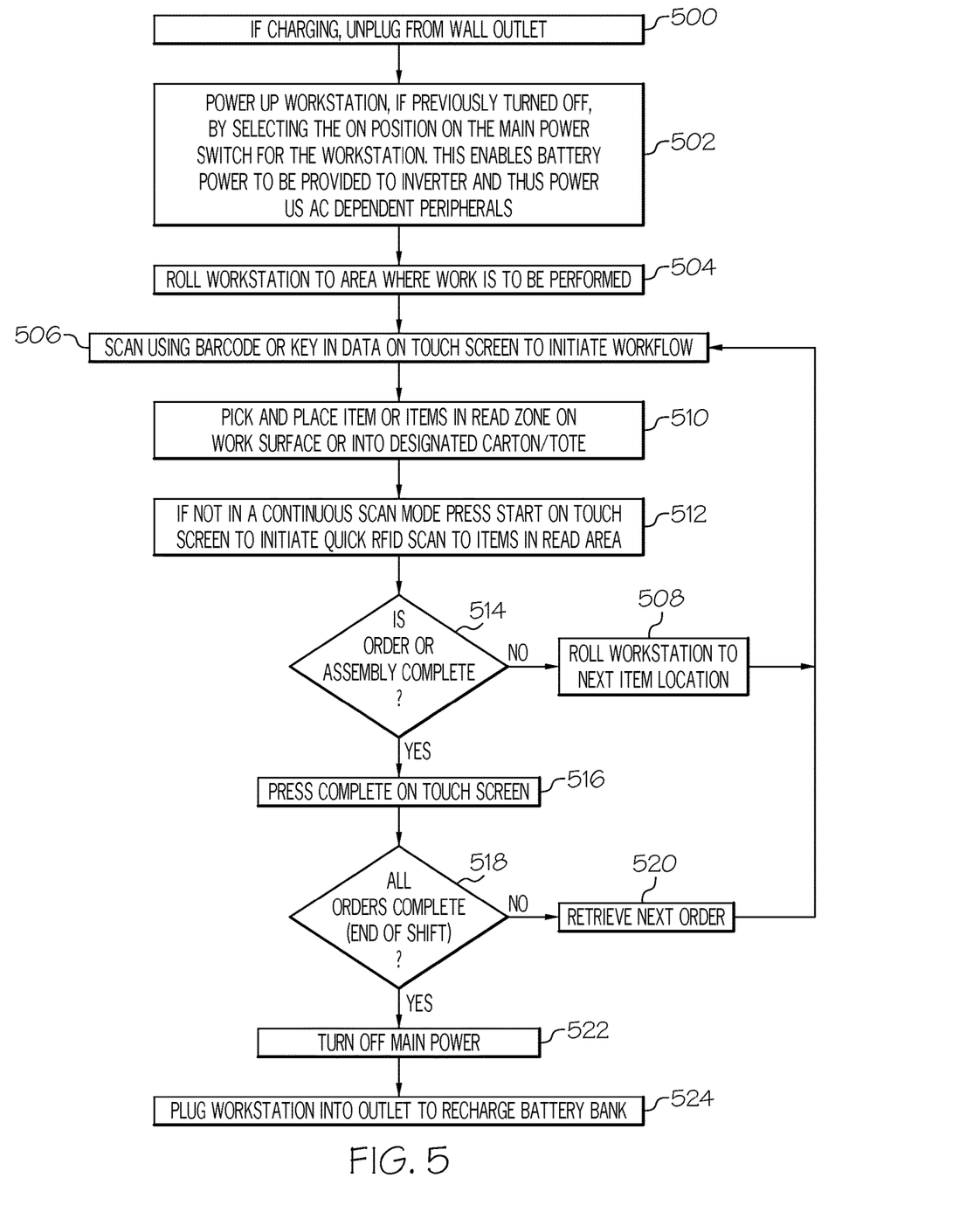
FIG. 5 illustrates a flowchart of the basic process for using the mobile RFID device in accordance with the disclosed architecture.

Generally referring to FIG. 5, the basic process of using a mobile RFID device (workstation) is disclosed. At 500, if the workstation device is charging, a user needs to first unplug the device from the wall receptacle (outlet). At 502, the device (workstation) is powered up, if previously turned off, by selecting the ON position on the main power switch of the device (workstation). This enables battery power to be provided to the inverter and thus powers the AC dependent peripheral devices. At 504, the user rolls the device (workstation) to the area where work is to be performed. At 506, the user scans items using the barcode scanner or keys in data on the touchscreen to initiate workflow. At 508, if it is determined that the items are scanned-in correctly, then the device (workstation) is rolled to the next item location and at 520, the user retrieves the next order.

At 510, if the items need additional scanning, then the items are placed in the read zone on the work surface or into the designated carton/tote. If the device (workstation) is not in a continuous scan mode, then at 512, the user would press start on the touch screen to initiate a quick RFID scan of the items in the read area. At 514, it is determined if the order or assembly is complete. If no, then at 508 the device (workstation) is rolled to the next item location, and at 520, the user retrieves the next order. If yes, then at 516, then the user presses complete on the touchscreen. At 518, it is determined if all orders are complete so the user should end the shift. If no, at 520, the user retrieves the next order. If yes, then at 522, the user turns off the main power of the device (workstation), and at 524, the user plugs the device (workstation) into the wall outlet (receptacle) to recharge the battery bank.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile radio frequency identification (RFID) device, comprising:
    a wheeled cart comprising an enclosure below a lower shelf;
    a fixed RFID reader mounted to the wheeled cart;
    a directional antenna that is hidden and capable of being communicatively coupled to the RFID reader, wherein the directional antenna is concealed on the wheeled cart and only focuses RF energy within a defined area on the wheeled cart so that items are scanned only within the defined area and where the defined area is a recessed well on a top of the wheeled cart; and
    a processing unit mounted to the wheeled cart and communicatively coupled to the RFID reader for operational control of the RFID reader;
    an electrical cord such that the device can be plugged in providing AC power.

2. The mobile RFID device of claim 1, wherein the processing unit comprises a touchscreen.

3. The mobile RFID device of claim 2, wherein data is collected and stored locally on the processing unit.

4. The mobile RFID device of claim 2, wherein data is interfaced wirelessly to an information technology (IT) infrastructure.

5. The mobile RFID device of claim 1, further comprising a barcode scanner mounted to the wheeled cart and communicatively coupled to the RFID reader.

6. The mobile RFID device of claim 1, further comprising a host computer communicatively coupled to the RFID reader for operational control of the RFID reader.

7. The mobile RFID device of claim 1, further comprising an inverter for converting DC to AC power mounted to the wheeled cart.

8. The mobile RFID device of claim 1, further comprising a battery and a battery charger mounted to the wheeled cart.

9. A mobile radio frequency identification (RFID) device, comprising:
- a wheeled cart comprising a top surface, an open lower shelf below the top surface, and a lower enclosure below the open lower shelf, where the lower enclosure is a storage cabinet;
- a fixed RFID reader mounted to the wheeled cart;
- a directional antenna capable of being communicatively coupled to the RFID reader, wherein the directional antenna is concealed on the wheeled cart and only focuses RF energy within a defined area on the wheeled cart and where the defined area is a recessed well; and
- a processing unit mounted to the wheeled cart and communicatively coupled to the RFID reader for operational control of the RFID reader; and
- wherein the defined area is a flat work surface on the top surface of the wheeled cart;
- a volt inverter able to support a plurality of peripheral devices.

10. The mobile RFID device of claim 9, further comprising a barcode scanner mounted to the wheeled cart and communicatively coupled to the RFID reader.

11. The mobile RFID device of claim 9, further comprising a host computer communicatively coupled to the RFID reader for operational control of the RFID reader.

12. The mobile RFID device of claim 9, wherein the processing unit comprises a touchscreen.

13. The mobile RFID device of claim 12, wherein data is collected and stored locally on the processing unit.

14. The mobile RFID device of claim 12, wherein data is interfaced wirelessly to an information technology (IT) infrastructure.

15. The mobile RFID device of claim 9, further comprising an inverter, a battery and a battery charger mounted within the lower enclosure of the wheeled cart.

16. A mobile radio frequency identification (RFID) device, comprising:
- a wheeled cart comprising a top surface, an open lower shelf below the top surface, and a lower enclosure below the open lower shelf, where the lower enclosure is a storage cabinet;
- a fixed RFID reader mounted to the wheeled cart;
- a directional antenna capable of being communicatively coupled to the RFID reader, wherein the directional antenna is concealed on the wheeled cart and only focuses RF energy within a defined area on the wheeled cart;
- a processing unit mounted to the wheeled cart and communicatively coupled to the RFID reader for operational control of the RFID reader; and
- a barcode scanner mounted to the wheeled cart and communicatively coupled to the RFID reader;
- a processing unit comprises a touchscreen, and data is collected and stored locally on the processing unit, or interfaced wirelessly to an information technology (IT) infrastructure; and
- wherein the defined area is a recessed well formed by a metal tub on the top surface of the wheeled cart;
- a volt inverter able to support a plurality of peripheral devices.

17. The mobile RFID device of claim 16, further comprising an inverter, a battery and a battery charger mounted within the lower enclosure of the wheeled cart.

18. A system for using a radio frequency identification (RFID) device, comprising:
- a RFID reader;
- a directional antenna that is hidden and capable of being communicatively coupled to the RFID reader, wherein the directional antenna is concealed and focuses RF energy within a defined area;
- a volt inverter able to support a plurality of peripheral devices;
- a processing unit communicatively coupled to the RFID reader for operational control of the RFID reader, the processing unit having a touchscreen, data is collected and stored locally on the processing unit, or interfaced wirelessly to an information technology (IT) infrastructure; and
- a barcode scanner communicatively coupled to the RFID reader.

* * * * *